US006684176B2

(12) United States Patent
Willins et al.

(10) Patent No.: US 6,684,176 B2
(45) Date of Patent: Jan. 27, 2004

(54) THREE DIMENSIONAL (3-D) OBJECT LOCATOR SYSTEM FOR ITEMS OR SITES USING AN INTUITIVE SOUND BEACON: SYSTEM AND METHOD OF OPERATION

(75) Inventors: Bruce A. Willins, East Northport, NY (US); David Goren, Smithtown, NY (US); Richard M. Vollkommer, Smithtown, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 149 days.

(21) Appl. No.: 09/961,373

(22) Filed: Sep. 25, 2001

(65) Prior Publication Data

US 2003/0061001 A1 Mar. 27, 2003

(51) Int. Cl.[7] .............................................. G01C 17/00
(52) U.S. Cl. ........................ 702/150; 702/152; 702/153; 340/988; 701/211; 701/208
(58) Field of Search ................................. 701/300–302, 701/207, 211, 224; 340/988, 990, 993–995; 702/150–153

(56) References Cited

U.S. PATENT DOCUMENTS

| 4,278,975 | A |   | 7/1981 | Kimura et al. .............. 343/6 R |
| 4,912,643 | A |   | 3/1990 | Bierxe ........................ 364/449 |
| 5,017,930 | A |   | 5/1991 | Stoltz et al. ................. 342/465 |
| 5,394,332 | A |   | 2/1995 | Kuwabara et al. ........... 364/449 |
| 5,446,701 | A |   | 8/1995 | Utke et al. ................... 367/118 |
| 5,528,232 | A |   | 6/1996 | Verma et al. ........... 340/825.54 |
| 5,798,733 | A |   | 8/1998 | Ethridge ..................... 342/357 |
| 6,069,585 | A | * | 5/2000 | Lanciaux .................... 342/443 |
| 6,097,189 | A |   | 8/2000 | Arndt et al. ................. 324/326 |
| 6,184,789 | B1 |  | 2/2001 | Richley et al. ............. 340/571 |
| 6,281,811 | B1 | * | 8/2001 | Ranzino ..................... 340/988 |
| 6,401,028 | B1 | * | 6/2002 | Kamiya et al. ............. 701/200 |
| 2002/0011951 | A1 | * | 1/2002 | Pepin et al. ........... 342/357.13 |

FOREIGN PATENT DOCUMENTS

| DE | 19640068 A | 4/1998 |
| GB | 2255250 A | 10/1992 |
| WO | WO 00/62089 | 10/2000 |

* cited by examiner

*Primary Examiner*—Marc S. Hoff
*Assistant Examiner*—Andrew Morris

(57) ABSTRACT

An object locator system generates an audio signal as if emanating from the object as a user varies angular orientation and distance from an object or site to be located within an area. A computer linked to an access transceiver receives transmissions from a user wearing a headset including a transceiver and electronic compass. The compass provides a signal indicative of the user orientation. An access transceiver receives the signal and calculates the location of the user based on the time difference of arrival of the RF signal and triangulation of the user movement. An accelerometer in the headset continuously tracks user movement. The location of the object in a vertical direction is provided by a directory or other reference source stored in the computer. Based on the angular orientation, horizontal and vertical distance of the object or site relative to the user, the computer maps the location information into sounds in the form of pulse amplitude or frequency modulated sound. The audio signal is perceived by the user as emanating from the object or site.

23 Claims, 4 Drawing Sheets

THREE DIMENSIONAL (3-D) OBJECT LOCATOR SYSTEM FOR ITEMS OR SITES USING AN INTUITIVE SOUND BEACON: SYSTEM AND METHOD OF OPERATION

BACKGROUND OF INVENTION

1. Field of Invention

This invention relates to object locator systems and methods of operation. More particularly, this invention relates to a three dimensional (3-D) object locator system for items or sites using an intuitive sound beacon: system and method of operation

2. Description of Prior Art

There are many occasions in a user's activity to locate an item or a site. The search for the item or site often turns out to be a time consuming, expensive, in terms of lost man-hours, and a frustrating problem. There are many techniques to direct a use to an item or site ranging from visual maps with directions, to using a GPS with speech. Maps are time consuming to follow and require that the user divert his/her attention as they look for an item or a site. Verbal prompts combined with GPS (such as those used in automotive applications), enable hands-and-eyes free operation but are difficult to integrate into systems used indoors and outdoors and may require additional concurrent speech input/output. One example to illustrate the problem is "warehouse picking" in which a user picks and bundles selected items gathered from within a warehouse. The picker is provided a "pick list" which includes the location, type and quantity of the item(s) to be picked. In the past, the pick list was written on paper. Current state-of-the-art warehouses are replacing paper lists with mobile terminals using either display or speech input/output to identify the item to be picked. All such modalities provide a destination location, such as an aisle and bin number, for each pick item. However, mobile terminals, for example, do not provide assistance in identifying the destination of the item, requiring the user to remember the location of the item or go back to the pick list if the destination is forgotten. What is needed in the art is an object locator system which provides continual directional feedback from an item or site to a user from any starting point within an area thereby saving time and expense in locating items or sites without irritating frustration.

Prior art related to object locator systems for items or sites, includes:

1) U.S. Pat. No. 6,097,189 issued Aug. 1, 2000 discloses a portable system that is operational for determining, with three dimensional resolution, the position of a buried object or a proximately positioned object that may move in space or air or gas. The system has a plurality of receivers for detecting the signal from a target antenna and measuring the phase thereof with respect to a reference signal. The relative permittivity and conductivity of the medium in which the object is located is used along with the measured phase signal to determine a distance between the object and each of the plurality of receivers. Knowing these distances, an iteration technique is provided for solving equations simultaneously to provide position coordinates. The system may also be used for tracking movement of an object within close range of the system by sampling and recording subsequent positions of the object. A dipole target antenna, when positioned adjacent to a buried object, may be energized using a separate transmitter which couples energy to the target antenna through the medium. The target antenna then preferably resonates at a different frequency, such as a second harmonic of the transmitter frequency.

2) U.S. Pat. No. 5,528,232 discloses a communication system that communicates for locating one or more tags in a time and energy efficient manner. The tags are positioned in a communication region and are located by a locator. The tags are located through organized transmission and reception of signals between the tags and the locator. The locator locates and gives directions to tags from the locator using a radio link and a multi-channel ultrasonic acoustic link. The combination of linkages provides the means to determine the unobstructed bearing and distance between the locator and the tag and resolves multipath reflections.

3) U.S. Pat. No. 5,798,733 discloses a position guidance apparatus is a microprocessor-based tool used to aid a parachute jumper in reaching a predetermined target position in an interactive manner. The device is particularly valuable in aiding those who have to do parachute jumps under hazardous conditions such as at night, into terrain with no visible orientation features, or into terrain wherein a precisely located landing is desired. The position guidance apparatus provides location/directional guidance in a visual and potentially audible manner to guide the user in steering he/she into an appropriate targeted landing zone. The apparatus is one that is preferably strapped onto the forearm of a user and provides a small graphical display of current position, target position, and predicted destination position. Alternatively, the display can be implemented as a heads-up display for the user. The display further relays instruction information to the user to vary the predicted destination position and thereby minimize deviation from a predetermined target position.

4) U.S. Pat. No. 5,394,332 discloses to an on-board navigation system which continuously informs a driver of the degree of approach of a vehicle to a destination by outputting a sound suited to the driver's actual running feeling.

None of the prior art discloses an object locator system for items and/or sites in which the system tracks the user relative to the item or site to be located and generates sound cues perceived by the user as originating from the item or site to be located, the sound cues changing in intensity as the user moves toward or away from the item or site to be located.

SUMMARY OF INVENTION

An object locator system generates an audio signal as if emanating from the object as a user varies angular orientation and distance from an object or site to be located within an area. The system includes a central computer linked to an access transceiver receiving RF transmission from a user wearing a headset including a transceiver and electronic compass. The compass provides a signal indicative of the user orientation which is received by access transceivers as an input to a computer for calculating the location of the user based on the time difference of arrival of the RF signal and triangulation of the user position. Optionally, an accelerometer may be included in the headset to continuously track user movement. The location of the object in x, y and z coordinates is provided by a directory or other reference source stored in the computer. The position of the user and the coordinates of the object may be used to calculate the orientation and distance of the user to the object. Based on the angular orientation, horizontal and vertical distance of the object or site relative to the user, the computer maps the location information into 3-D sounds in the form of pulse amplitude or frequency modulated sound. The audio signal is perceived by the user as emanating from the object or site. The sound changes in intensity as the user proceeds along the angular orientation to the object, the sound increasing in intensity as the angular sensitivity and/or distance to object is reduced. The sound fluctuates as the user travels or faces off-axis from the desired location. The headset also includes a microphone to permit the user to request directions to an item or site within a retail area. An operator is activated by the request to provide directions to the location of the object, orally or by an audio signal. Other applications include, upon user request, an operator providing guidance or an audio signal directing the user to other mobile users or attractions in an amusement park or museum, or stores in a shopping mall.

BRIEF DESCRIPTION OF DRAWINGS

The invention will be further understood from the following description of a preferred embodiment taken in conjunction with an appended drawing, in which.

DESCRIPTION OF PREFERRED EMBODIMENT

Figure 1:
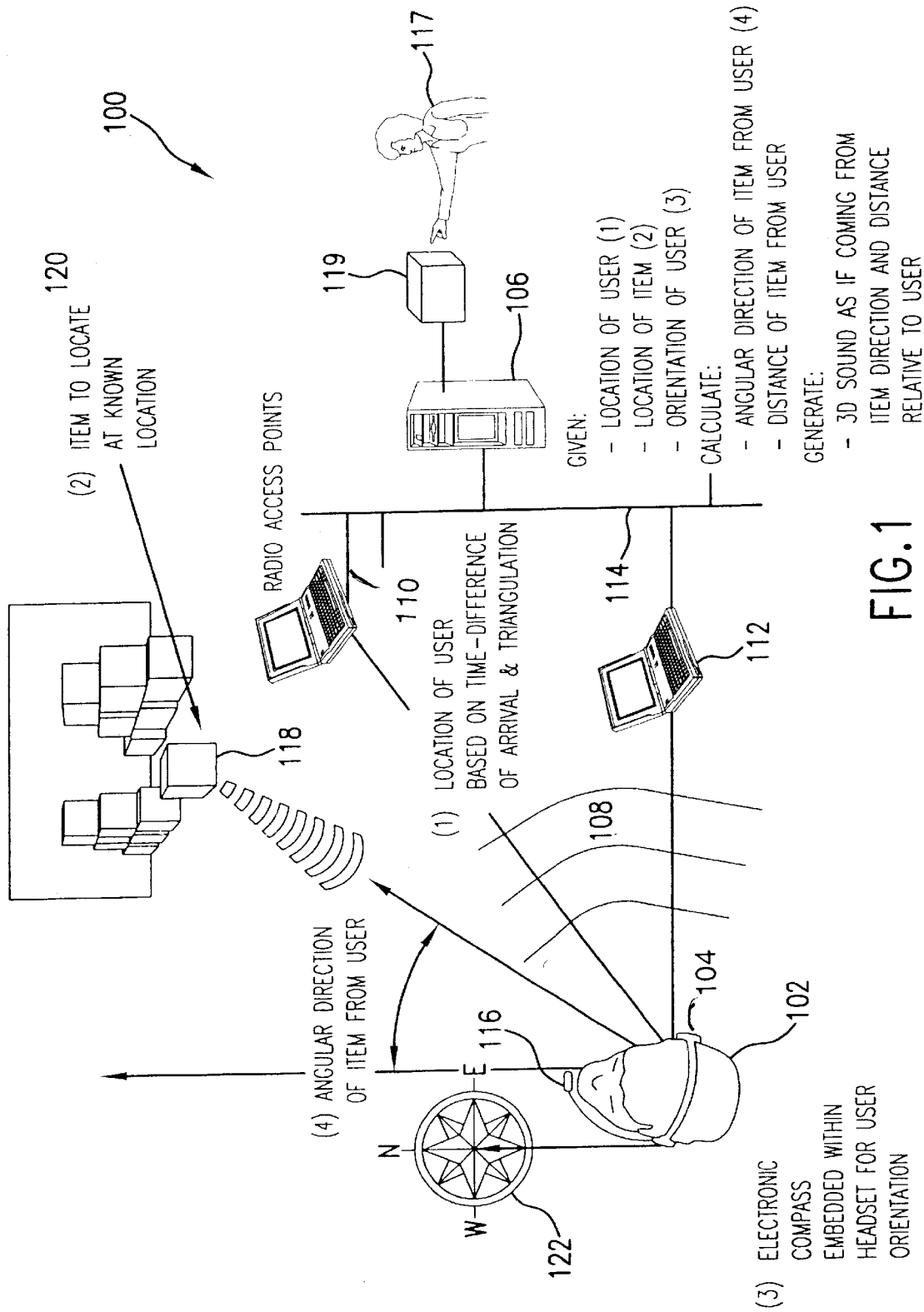
FIG. 1 is a representation of an object locator system incorporating the principles of the present invention.

In FIG. 1, an object locator system 100 includes a user 102 wearing a headset 104 coupled to a computer station 106 via an air link 108 and radio access points 110 and 112. A bus 114 interconnects the computer station 106 and the access points 110 and 112. The user is in audio or voice communication via a transceiver (not shown) including microphone 116 with the computer station 106 monitored by an operator 117 at a terminal 119. The operator may provide oral instructions to the user to locate an object, for example, an item 118 in a warehouse 120 or the user 102 may be automatically directed to the object by 3-D sounds, as will be described hereinafter. A compass in the headset, represented by compass dial 122, provides orientation to the user corresponding to the direction of vision. The user position or location is determined by the radio access points 110 and 112 based on the time difference of arrival of user transmission and triangulation of the user transmissions. The computer station 106 knowing the location of the user and orientation of the user relative to the item calculates the angular direction and distance of the item from the user. The calculated orientation and distance are converted into modulated RF signals; transmitted to the user, via the access point, and converted into 3-D sound cues in the headset. The sound cues operate as a homing beacon to the item being located by the user. Although the user could be directed to the item with spoken directions, the use of modulated sound has many advantages. Words are inefficient and interfere with other verbal commands/prompts. For example, in the warehouse, a user may be asking for the quantity and weight of an item while concurrently following a background sound beacon. From a system view, words require more memory storage, and represent a discrete sample. By using modulated sound, the user can be given constant feedback as to the proper heading. The sound essentially becomes a homing beacon perceived as originating from the item being located.

Numerous methods can be applied for mapping heading information into sounds using various types of headsets or speakers. Using a monaural system, the heading can be mapped into a form of pulse amplitude or frequency modulation scheme or various hybrids. In one embodiment, if the user is oriented on-line with the item, the sound cues or feedback is minimal. The intensity of the sound queues would be proportional to orientation or directional error.

The sound can be synthesized to reflect a three-dimensional location of the item and is varied based on the distance between the item and the user. At relatively far distances, where a small angular deviation can apply large physical distance errors, the feedback sensitivity (change in sound as a function of angle) is increased that is (a small difference in angle causes a wider fluctuation in sound). As the user nears the item, the angular sensitivity is reduced to improve precision location of the item.

Figure 2:
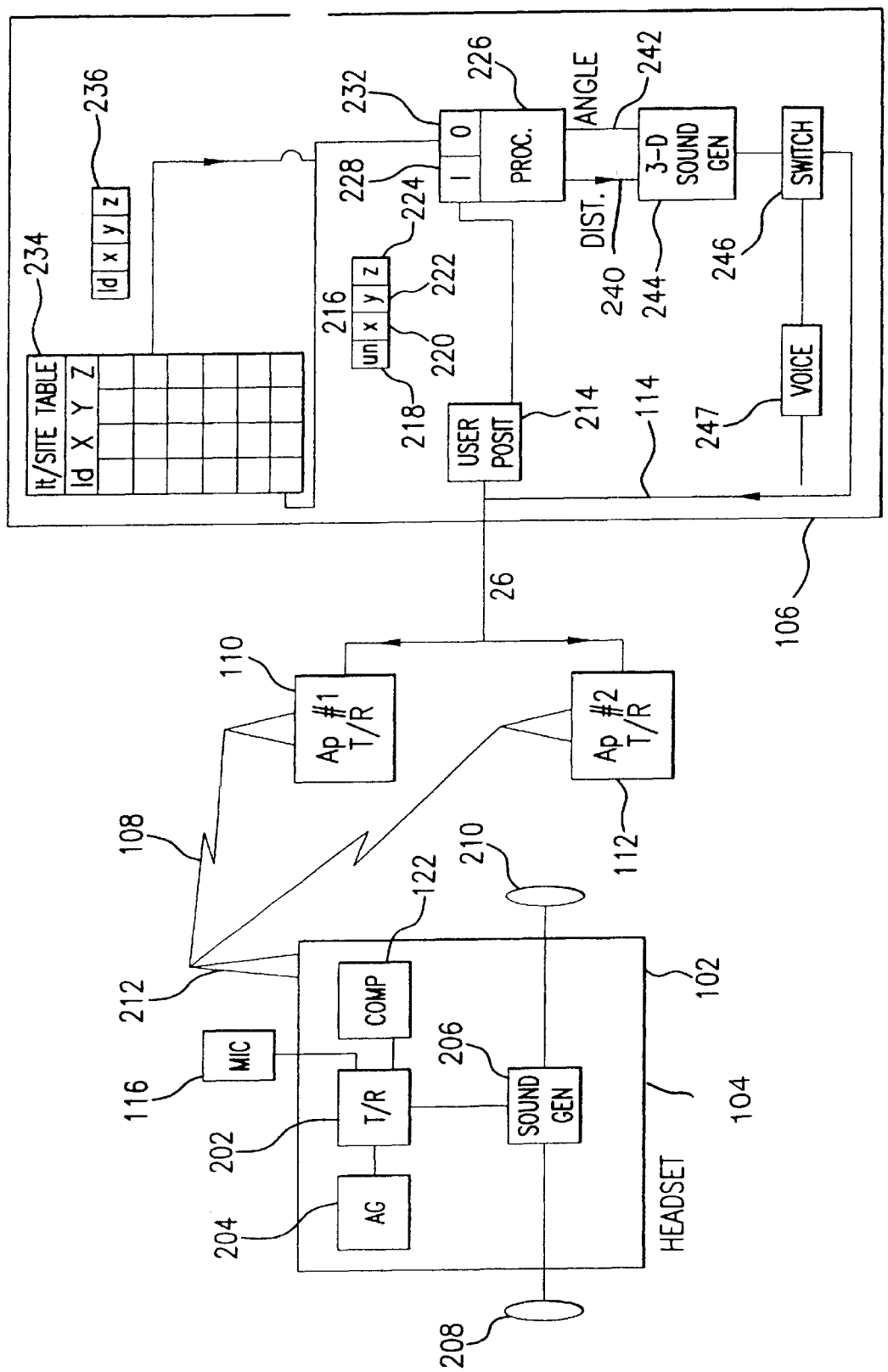
FIG. 2 is a representation of a user headset and station in the system of FIG. 1.

FIG. 2 shows further details of the system 100 of FIG. 1. The headset 102 includes a transmitter receiver (transceiver) 202 coupled to the microphone 116 and the compass 122. If the compass is not provided, the user orientation can be generated by an accelerometer 204 continuously tracking the user's movement and generating a directional vector which can be substituted for the electronic compass display. The transceiver 202 is further connected to an audio amplifier or sound generator 206 linked to earphones 208 and 210. An antenna 212 attached to the headset is coupled to the transceiver which sends and receives RF transmissions to the access point 110 and 112 linked to the computer station 106. The operator 117 monitors the computer station at the terminal 119 (See FIG. 1).

In the computer station 106, a user position determining unit 214 receives the user transmissions from the access points 110 and 112 and calculates the user's absolute position in terms of grid coordinates x, y and z based upon well know laser or radio triangulation principles described, for example, in U.S. Pat. No. 4,912,643 issued Mar. 27, 1990. Alternatively, the user position may be calculated at the access points in lieu of the computer station. In any case, the positioning determining unit generates a packet 216 having several fields including a user identification (Id) field 218, an X-coordinate field 220, a Y coordinate field 222 and a Z coordinate field 224. The packet 216 is provided to a processor 226 at an input terminal 228. The operator 117 enters into the processor 226 via terminal 228 an item or site identification (Is) to be located by the user. The processor outputs the Id via terminal 232 to a storage device 234 having a listing of items or sites by Id. and their x, y and z coordinates. In response to the processor input, the storage device generates a packet 236, including the Id., x, y and z coordinates for the item to be located by the user which is received at processor input terminal 228. The processor 226 subtracts the x,y and z coordinates of the packet 216 and 236 and generates an output 240 indicating the distance (D) of the user to the item and an output 242 indicating the orientation or the angle of the user to the object to be located. Sound generator 244 uses the distance and angle signals to generate pulse modulated or frequency modulated signals indicative of the location of the item to the user. The pulse modulated or frequency-modulated signals are transmitted through switch 246 and via bus 114 to the access points which transmit the modulated RF signal over air link 108 to the user. The switch 246 enables the operator 117 to turn off the modulated signals and establish voice communications with the user via voice transceiver 247.

The headset antenna 212 captures the modulated signals which are processed by the transceiver 202; provided to the sound generator 206; converted into 3D sounds and transmitted to the earphone 208 and 210 for reception by the user. If the user is online, the 3D sound is minimal. Intensity of the 3-D sound is proportional to the directional error.

In another embodiment, the system 100 can provide customers within a retail super store the location of an item. In such case, the customer communicates with the operator, via a headset or a shopping cart with a microphone while the switch 247 is in the oral communication state. The operator can obtain the customer's location on a display in the terminal and direct the customer to the item in question by oral instruction following the customer's movements on the display and knowing the location of the item in the store. In still another embodiment, an operator may direct mobile users to a location in an amusement park or a museum or a store in a shopping mall, based on the operator knowing the location of the user and item in the environment in which the user is functioning.

Figure 3:
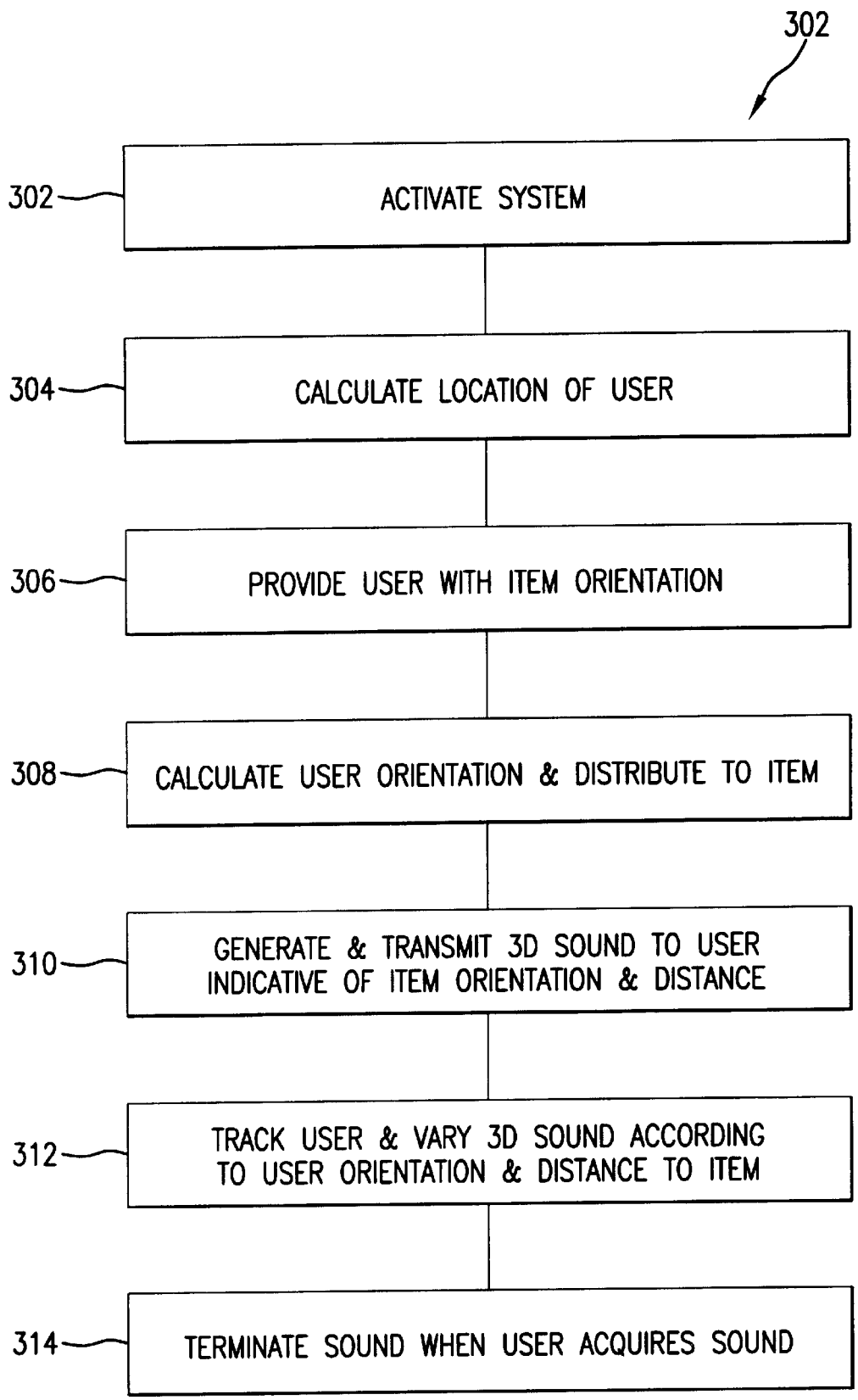
FIG. 3 is a flow diagram of a user operating the system of FIGS. 1 and 2 for item location by 3-D sound.

In FIG. 3, a flow diagram describes one embodiment of the system in a process 300, as follows:

Step 302: User activates object-locating system by donning a headset and activating communication with an operator at a computer station serving the system.

Step 304: The computer station or access points connected to the computer station, calculate the location of the user in terms of x, y, z coordinates and user Id. using the time difference of arrival of the user's transmissions and radio triangulation.

Step 306: The operator instructs the user to locate an item at a site.

Step 308: The operator switches the system to automatic and the location of the item in terms of x, y and z coordinates and the user coordinates are compared in a processor to determine a distance and orientation of the user to the item.

Step 310: The distance and orientation parameters are translated into modulating signals corresponding to the distance and orientation of the user to the item in question.

Step 312: The user receives modulated RF signals as 3D sound cues and using an electronic compass in the headset, chooses an orientation, which minimizes the sound.

Step 314: The computer station tracks the user and the 3D sound is adjusted as the user approaches the item until the point where the sound disappears when the user has "picked" the item.

Figure 4:
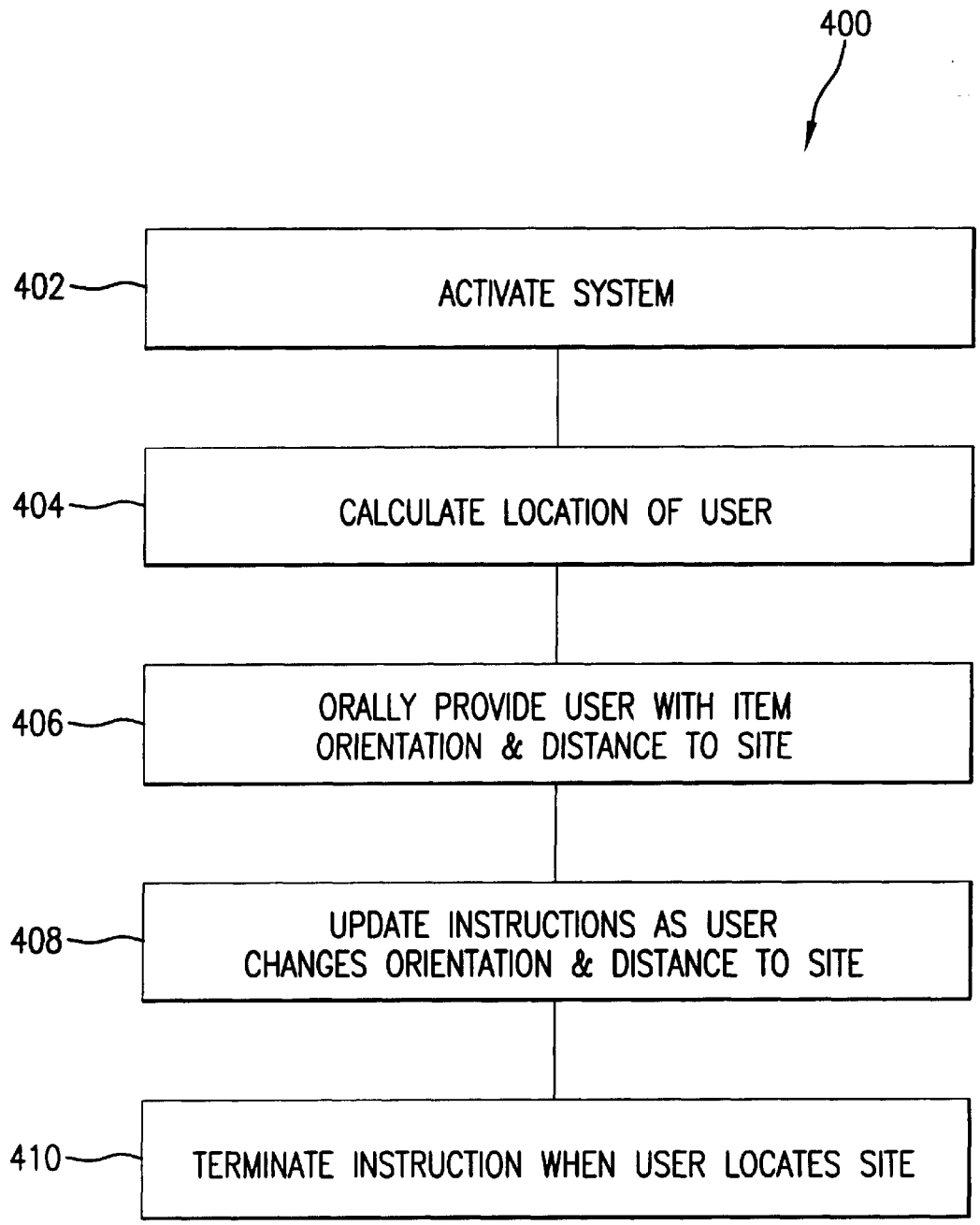
FIG. 4 is a flow diagram of the operation of the system of FIGS. 1 and 2 for site location by oral communication between a user and an operator.

In FIG. 4, a flow diagram describes a process 400 for directing a Locator, i.e. a customer or a service personnel or sales person to a site, as follows:

Step 402: The user activates the object locating system by donning a headset and activating communications with an operator at a computer station serving the system.

Step 404: The computer system or access point calculates the location of the user for an Id and x, y and z coordinates.

Step 406: The operator, knowing the location of the site to be located, orally transmits instructions to orient the user towards the site to be located.

Step 408: The computer station tracks the position of the user for display at the computer station or receives oral feedback from the user as movement occurs along the orientation to the desired site.

Step 410: The user continues dialog with the operator until the site is located.

While the invention has been shown and described in conjunction with preferred embodiments, various changes can be made without departing from the spirit and scope of the invention, as to defined in the appended claims, in which

We claim:

1. An object locator system comprising:
   (a) a user-mounted orientation apparatus including a transceiver which electronically transmits a RF signal representative of the user's vision orientation in a 360-degree azimuth;
   (b) a processor linked to access transceivers and receiving the RF signal;
   (c) an object directory or reference source stored in the processor and providing the location of an object in a three dimensional coordinate system to the processor;
   (d) calculating apparatus, executing in the processor, which calculates the angular orientation of the user's vision and distance of the user to the object to be located in three dimensions; and
   (e) audio apparatus responsive to the processor for generating and transmitting an audio signal based on the processor calculations, the audio signal characterized as three dimensional and perceived by the user as emanating from the object to be located.

2. The system of claim 1 further comprising:
   (f) modulating apparatus which changes the intensity of the audio signal as the user approaches the object or travels or faces off-axis from the object location.

3. The system of claim 1 further comprising:
   (g) an electronic compass in the user mounted orientation apparatus for providing the signal indicative of the user's vision orientation in the azimuth.

4. The system of claim 1 further comprising:
   (h) an accelerometer in the user mounted orientation apparatus for tracking user movement and providing a signal indicative of the user position.

5. The system of claim 1 further comprising:
   (i) position location apparatus in the access transceiver for calculating the user position by the time difference of arrival of the signal and triangulation; and
   conversion apparatus for converting the user position into the three-dimensional coordinate system.

6. The system of claim 1 further comprising:
   (j) an operator station for communicating with user.

7. The system of claim 1 further comprising:
   (k) switching apparatus for transferring the user from the audio signal to an operator for interactive communication.

8. The system of claim 1 wherein the user mounted orientation apparatus further comprises:
   (l) a headset set and antenna for receiving the audio signal; and
   a microphone enabling the user to communicate with an operator.

9. The system of claim 1 wherein the reference source generates the location of the object in a digital packet containing an object identification and object location in three dimensional coordinates.

10. The system of claim 1 wherein user position apparatus generates a digital packet containing a user identification and location in three-dimensional coordinates.

11. The system of claim 1 wherein the processor recieves digital packets from the access transceivers and the references source and calculates the user position in terms of angular orientation of the user's vision and distance to the object to be located.

12. An object locator system generating three dimensional sounds perceived by a user as emanating from an object to be located, comprising:
   (a) a portable user station transmitting a signal for representative of the user's direction of vision and position for location and communication purposes;
   (b) a central station receiving the signal and providing the location of the portable user station in three dimensions relative to an object to be located as an output signal; and
   (c) sound generating apparatus responsive to the output signal and providing to the user portable station the three dimensional audio signal which changes in intensity as the user portable station varies in angular orientation of the user's vision and distance to the object to be located.

13. The system of claim 12 further comprising:
   (d) an operator station coupled to the central station for communicating with the user portable station in lieu of the three dimensional audio signal.

14. The system of claim 12 further comprising:
   (e) calculating apparatus in the central station for calculating the angular orientation of the user's vision and distance of the user to the object to be located.

15. The system of claim 12 further comprising:
   (f) position location apparatus including access transceivers in the central station for calculating the user position by the time difference of arrival of the signal and triangulation system.

16. A method for locating an object at an unknown location, comprising:
   (a) generating an electronic signal indicative of a user's vision orientation in a 360-degree azimuth;
   (b) transmitting the signal to a processor via access transceivers;
   (c) storing in the processor a directory signal indicative of the location of the object in a three dimemsional coordinate system;
   (d) calculating the distance and vision orientation of the user relative to the object to be located in three dimensions; and
   (e) generating and transmitting via the access transceivers a three dimensional audio signal to the user, the audio signal characterized as emanating from the location of the object and changing in amplitude or phase intensity as the user approaches the object or travels or faces off-orientation from the desired location.

17. The method of claim 16 further comprising:
   (f) modulating the intensity of the audio signal as the user approaches the object or travels or faces off-axis from the object location.

18. The method of claim 16 further comprising:
   (g) tracking user movement and providing a signal indicative of the user position.

19. The method of claim 16 further comprising:
   (i) calculating the user position by the time difference of arrival of the signal and triangulation.

20. The method of claim 16 further comprising:
   (k) transferring the user from the audio signal to an operator for interactive communication.

21. The method of claim 16 further comprising:
   (l) generating the location of the object in a digital packet containing an object identification and object location in three-dimensional coordinates.

22. The method of claim 16 further comprising:
   (m) generating a digital packet containing a user identification and location in three-dimensional coordinates.

23. The method of claim 16 further comprising:
   (n) receiving signals from the access transceivers and directory signals stored in the processor and calculating the user position in terms of angular orientation of the user's vision and distance to the object to be located.

* * * * *